United States Patent
Barravecchio

[19]

[11] Patent Number: 6,063,421
[45] Date of Patent: May 16, 2000

[54] METHOD AND APPARATUS FOR RETHERMALIZING PRE-COOKED FOOD PORTIONS

[76] Inventor: Joseph Barravecchio, 51 Alvine Ave., Staten Island, N.Y. 10304

[21] Appl. No.: 09/116,004

[22] Filed: Jul. 15, 1998

[51] Int. Cl.⁷ .............................. A23L 1/00; A47J 27/00
[52] U.S. Cl. ........................... 426/231; 99/325; 99/330; 99/332; 99/333; 99/468; 99/483; 426/233
[58] Field of Search .................................. 426/231, 233, 426/506, 520; 99/325, 330, 331, 332, 333, 403, 468, 483

[56] References Cited

U.S. PATENT DOCUMENTS

| | | |
|---|---|---|
| 3,790,391 | 2/1974 | Bolleter et al. . |
| 3,928,045 | 12/1975 | Tsunoda et al. . |
| 4,175,482 | 11/1979 | Kumagaya . |
| 4,214,514 | 7/1980 | Contino et al. . |
| 4,569,277 | 2/1986 | Stiglich . |
| 4,732,080 | 3/1988 | Vita . |
| 4,803,916 | 2/1989 | Tacconi . |
| 4,803,917 | 2/1989 | Barbieri . |
| 4,821,632 | 4/1989 | Bolzani et al. . |
| 4,869,160 | 9/1989 | Pratolongo . |
| 4,901,632 | 2/1990 | Lori . |
| 5,010,806 | 4/1991 | Narcisi et al. . |
| 5,033,364 | 7/1991 | Narcisi et al. . |
| 5,215,001 | 6/1993 | Narcisi . |
| 5,220,864 | 6/1993 | Ejiri et al. . |
| 5,241,899 | 9/1993 | Kuhlman . |
| 5,282,498 | 2/1994 | Cahlander et al. . |
| 5,313,876 | 5/1994 | Hilger et al. . |
| 5,315,919 | 5/1994 | Hoeberigs . |
| 5,347,917 | 9/1994 | Vezzani et al. . |
| 5,351,605 | 10/1994 | Sai et al. . |
| 5,353,847 | 10/1994 | Cahlander et al. . |
| 5,361,684 | 11/1994 | Cattaneo . |
| 5,365,831 | 11/1994 | Kuhlman . |
| 5,404,797 | 4/1995 | Millar . |
| 5,542,344 | 8/1996 | Koether et al. ........................... 99/483 |
| 5,586,487 | 12/1996 | Marino . |
| 5,609,093 | 3/1997 | Hohler et al. . |
| 5,613,423 | 3/1997 | Polster . |
| 5,630,359 | 5/1997 | Stein . |

*Primary Examiner*—George C. Yeung
*Attorney, Agent, or Firm*—Ostrolenk, Faber, Gerb & Soffen, LLP

[57] ABSTRACT

A method and apparatus for final rethermalizing of a pre-cooked food product. The method comprises providing a heating fluid into a heating chamber via a controlled valve, sensing the level of the heating fluid in the heating chamber, controlling the controlled valve to maintain the level of the heating fluid in the heating chamber at a preset level, heating the heating fluid when it has reached a predetermined level, sensing the temperature of the heating fluid in the heating chamber, maintaining the temperature of the heating fluid at a preset temperature, placing the food product into at least one rethermalizing receptacle, moving the rethermalizing receptacle from a first position outside the heating chamber to a second position within the heating chamber to rethermalize the food product when the temperature of the heating fluid is at the preset temperature and the level of the heating fluid is at the preset level, maintaining the rethermalizing receptacle in the second position for a preset period of time while maintaining the preset temperature and the preset level of the heating fluid; and moving the rethermalizing receptacle to the first position after the preset period of time.

54 Claims, 11 Drawing Sheets

METHOD AND APPARATUS FOR RETHERMALIZING PRE-COOKED FOOD PORTIONS

BACKGROUND OF THE INVENTION

The present invention relates to a method and apparatus for final rethermalizing of precooked food products such as pasta products and particularly, individual sized portions of pasta products.

There is a need for an apparatus for rethermalizing food products such as pasta products quickly and to order, and particularly a need to rethermalize individual sized ready-to-eat portions of pasta promptly and to order. Even more particularly, there is a need to be able to supply individual sized portions of pasta which are cooked properly and which have the requisite texture and consistency on a "fast food" basis.

In the past, it has not been possible to prepare pasta quickly, with the required texture and in individual sized portions. Means are known for cooking large quantities of pasta, but these typically will result in cooked pasta products which do not have the proper texture when served. If pasta is cooked in large quantities, typically, after some time passes, the pasta will continue to cook and will become soft, and not have the desired texture and consistency. Other systems have been developed to provide individual sized portions of pasta, but these systems are typically cumbersome and complex and rely on high pressure and high temperature. If pasta is cooked according to the prior art systems on a made to order basis, the process typically takes too long, particularly for consumers who are "on the run" and need to order and obtain food on a speedy basis. Accordingly, there is a need in the food service industry for equipment which will allow a consumer to obtain an individual sized portion of a pasta product to order, cooked to the proper consistency and texture, and which rethermalizes the pasta product in a short period of time, i.e., in a time period of a little more than a minute and generally, less than about two minutes and no more than about 4–5 minutes.

Applicant is aware of the following patents:

| Patent No. | Dated    | Name           |
|------------|----------|----------------|
| 5,347,917  | 9/20/94  | Vezzani et al. |
| 4,803,917  | 2/14/89  | Barbieri       |
| 4,732,080  | 3/22/88  | Vita           |
| 4,214,514  | 7/29/80  | Contino et al. |
| 5,215,001  | 6/1/93   | Narcisi        |
| 5,033,364  | 7/23/91  | Narcisi et al. |
| 5,010,806  | 4/30/91  | Narcisi et al. |
| 4,869,160  | 9/36/89  | Pratolongo     |
| 4,803,916  | 2/14/89  | Tacconi        |
| 4,741,261  | 5/3/88   | DiMaria        |
| 4,569,277  | 2/11/86  | Stiglich       |
| 5,630,359  | 5/20/97  | Stein          |
| 4,901,632  | 2/20/90  | Lori           |
| 5,586,487  | 12/24/96 | Marino         |
| 4,175,482  | 11/27/79 | Kumagaya       |
| 3,790,391  | 2/5/74   | Bolleter et al.|
| 5,609,093  | 3/11/97  | Hohler et al.  |
| 5,220,864  | 6/22/93  | Ejiri et al.   |
| 5,313,876  | 5/24/94  | Hilger et al.  |
| 4,821,632  | 4/18/89  | Bolzani et al. |
| 3,928,045  | 12/23/75 | Tsunoda et al. |
| 5,351,605  | 10/4/94  | Sai et al.     |
| 5,241,899  | 9/7/93   | Kuhlman        |
| 5,365,831  | 11/22/94 | Kuhlman        |
| 5,613,423  | 3/25/97  | Polster        |
| 5,282,498  | 1/1/94   | Cahlander et al.|
| 5,353,847  | 10/11/94 | Cahlander et al.|
| 5,315,919  | 5/31/94  | Hoeberigs      |
| 5,404,797  | 4/11/95  | Millar         |

The Vezzani et al. patent discloses a machine, which may be microprocessor controlled, for preparing pasta based dishes starting from pre-cooked deep frozen pasta products. The machine includes a basket adapted to receive dosages of pre-cooked deep frozen pasta, a vat containing heated water, a drive arrangement for moving the basket between the dipped position where the basket is submerged under the heating water contained in the vat for heating the pre-cooked deep frozen pasta and a removed position where the basket is removed from the vat.

The Vezzani et al. reference is directed in particular to the means employed for loading the pasta into the cooking basket. The means employed comprises two chests 12 each slidable in a respective box-type seat 13 inside a body 11. The chest is open at the top and bottom. The seats 13 have bottom openings 19 so that the pasta disposed in the chests 20 can drop into the basket 23 which can then be immersed in the heated water in the vat 20. A basket is immersed in the vat 20 using a pivoting arrangement.

Another reference is U.S. Pat. No. 4,803,917 to Barbieri for an automatic apparatus to cook and serve ready-to-eat pasta helpings. In this reference, the cooking vessel 5 is movable between a higher and lower position. In the higher position, the pasta contained in a basket 18 is cooked. The basket has a clam shell arrangement which opens from the bottom to dispense the pasta onto a plate, for example, plate 32 shown in FIG. 4, once the pasta has been cooked. This reference notes in col. 5, at lines 12–19 that it can be used for pre-cooked pasta, in which case the cooking time can be reduced. Another reference which discloses the cooking of pre-cooked foods including pasta is U.S. Pat. No. 4,732,080. This reference describes an apparatus for preparing hot food, including the pre-cooking operation and the later storing, heating and dispensing operation.

There are a number of references directed to cookers for cooking individual portions of food products, including pasta. For example, see U.S. Pat. No. 4,214,514 to Contino et al., U.S. Pat. Nos. 5,215,001, 5,033,364 and 5,010,806 to Narcisi and Narcisi et al., U.S. Pat. No. 4,869,160 to Pratolongo, U.S. Pat. No. 4,803,916 to Tacconi, U.S. Pat. No. 4,741,261 to DiMaria, U.S. Pat. No. 4,569,277 to Stiglich and U.S. Pat. No. 5,630,359 to Stein. Each of these references is directed to a pasta cooking apparatus. Generally, these devices employ pressurized heated water to cook the pasta quickly. Accordingly, uncooked pasta can be cooked in a relatively short period of time because it is cooked at a high temperature and pressure. There is a need for a less complex and less dangerous pasta rethermalizing device wherein pasta is rethermalized at atmospheric pressure and at temperatures below the boiling point of water for a short period of time because the pasta is precooked and therefore does not need to be cooked for a long period of time.

Other references, not necessarily directed to cooking individual servings of pasta, but which employ pressurized cooking techniques include U.S. Pat. No. 4,901,632 to Lori, U.S. Pat. No. 5,586,487 to Marino, U.S. Pat. No. 4,175,482 to Kumagaya and U.S. Pat. No. 3,790,391 to Bolleter et al.

In addition, there are a number of other references of which applicant is aware including U.S. Pat. No. 5,609,093 to Hohler et al., U.S. Pat. No. 5,220,864 to Ejiri et al., U.S. Pat. No. 5,313,876 to Hilger et al, U.S. Pat. No. 4,821,632 to Bolzani et al., U.S. Pat. No. 3,928,045 to Tsunoda et al., U.S. Pat. No. 5,351,605 to Sai et al. and U.S. Pat. No. 5,241,899 and U.S. Pat. No. 5,365,831 to Kuhlman. These are directed to larger scale pasta cooking systems or pasta cooking systems using specialized techniques, for example, employable in vending machines. Other references include U.S. Pat. No. 5,613,423 to Polster for a cooker/rethermalizer, U.S. Pat. Nos. 5,282,498 and 5,353,847 to Cahlander et al. directed to food dispensing devices and U.S. Pat. No. 5,315,919 to Hoeberigs and U.S. Pat. No. 5,404,797 to Millar directed to apparatus for use with fried foods.

Although the above patents show a number of devices and methods for cooking pasta and other food products, there is a need in the industry for a method and apparatus for cooking individual sized portions of pasta products, and particularly pre-cooked pasta products, and which can be used to provide ready-to-eat pasta products to consumers quickly and conveniently.

SUMMARY OF THE INVENTION

It is generally an object of the present invention to provide a method and apparatus for rethermalizing pasta products quickly.

It is further an object of the invention to provide a method and apparatus for rethermalizing pre-cooked pasta products, and particularly, flash frozen-pasta products, quickly and to order.

Yet still a further object of the present invention is to provide a method and apparatus for rethermalizing individual-sized ready-to-eat portions of pasta products quickly and to order.

Yet still a further object of the present invention is to provide a method and apparatus for rethermalizing pasta products quickly and to order and which maintains the desired texture and consistency of the pasta products.

Yet another object of the present invention is to provide a microprocessor controlled apparatus for rethermalizing pasta products of individual sized portions quickly and conveniently.

Yet still another object of the invention is to provide a microprocessor controlled apparatus for rethermalizing individual sized portions of pasta products which allows monitoring of the operation of the apparatus from a remote location.

The above and other objects of the invention are achieved by an apparatus for rethermalizing of a pre-cooked food product, comprising a support, a heating chamber on the support adapted to receive a heating fluid, a controlled valve for supplying heating fluid to the heating chamber, at least one rethermalizing receptacle for holding the food product, a first heater for heating the heating fluid in the heating chamber, a first temperature sensor disposed in the heating chamber, a first level sensor for sensing the level of the heating fluid in the heating chamber, a driving device for moving the rethermalizing receptacle from a first position outside the heating chamber to a second position within the heating chamber to rethermalize the food product, an electronic controller receiving an input from said temperature sensor and an input from said level sensor and having an output for controlling the controlled valve to maintain the level of the heating fluid in the heating chamber at a preset level; the controller further having an output for controlling the heater for heating the heating fluid when it has reached a predetermined level and for maintaining the temperature of the heating fluid at a preset temperature; said controller preventing said driving device from moving the rethermalizing receptacle to the second position unless the level of the heating fluid is at the preset level and the temperature of the heating fluid is at the preset temperature; said controller further comprising a timer for maintaining the rethermalizing receptacle in the second position for a preset period of time and for controlling the driving device to move the rethermalizing receptacle to the first position after said preset period of time.

The objects of the invention are also achieved by a method for rethermalizing of a pre-cooked food product, the method comprising the steps of providing a cooking fluid into a heating chamber via a controlled valve, sensing the level of the heating fluid in the heating chamber, controlling the controlled valve to maintain the level of the heating fluid in the heating chamber at a preset level, heating the heating fluid when it has reached a predetermined level, sensing the temperature of the heating fluid in the heating chamber, maintaining the temperature of the heating fluid at a preset temperature, placing the food product into at least one rethermalizing receptacle, moving the rethermalizing receptacle from a first position outside the heating chamber to a second position within the heating chamber to rethermalize the food product when the temperature of the heating fluid is at the preset temperature and the level of the heating fluid is at the preset level, maintaining the rethermalizing receptacle in the second position for a preset period of time while maintaining the preset temperature and the preset level of the heating fluid; and moving the rethermalizing receptacle to the first position after said preset period of time.

The objects of the invention are also achieved by a method for monitoring a rethermalizing operation from a remote location comprising, repetitively performing a rethermalizing operation at a first location, providing a sensor for determining the number of times the rethermalizing operation has been performed at the first location, providing a memory at the first location for storing a count related to the number of times the rethermalizing operation has been performed at the first location, and communicating a signal over a communication path to a second, remote location corresponding to the count related to the number of times the rethermalizing operation has been performed at the first location.

The objects of the invention are further achieved by an apparatus for monitoring a rethermalizing operation from a remote location comprising, a rethermalizing apparatus for repetitively performing a rethermalizing operation at a first location, a sensor determining the number of times the rethermalizing operation has been performed at the first location, a memory at the first location storing a count related to the number of times the rethermalizing operation has been performed at the first location, and a communication device for communicating a signal over a communication path to a second, remote location corresponding to the count related to the number of times the cooking operation has been performed at the first location.

As discussed, the invention relates to a machine for rethermalizing of pre-cooked pasta products. The pasta products are single portion-sized, pre-cooked, packaged and frozen for use with the machine.

The pre-cooked pasta need only be rethermalized for a short amount of time, generally at a temperature below the boiling point, for example 198° F. (92° C.). Typical rethermalizing times are, for example, 85 to 200 seconds, depending on the type of pasta.

The machine includes a number of pasta receiving basket receptacles which are attached to driving members which drive the receptacles into a heating chamber which is filled with heated water. The machine is preferably microprocessor driven and senses inputs including the level of water in the heating chamber and the temperature of the water. The machine will only allow the pasta to be lowered into rethermalizing position if there is water present and if the water temperature is at the proper temperature for rethermalizing the pasta.

The pasta receiving receptacles are generally screened, meshed or aperatured receptacles so that the heating waters flow therethrough to rethermalize the pasta. Each pasta receiving receptacle is detachable from a motor or otherwise driven preferably linear moving device which moves the pasta receiving receptacle from a position above the heating water to a position whereby the receptacle is immersed in the water for rethermalizing. Several pasta receiving receptacles may be provided so that multiple individual size portions can be rethermalized at once.

Once the pasta has been rethermalized for the requisite amount of time, the machine moves the pasta receiving receptacle or receptacles out of the heating water and the pasta is ready to be served. Another receptacle in the machine is used for heating sauces in sauce basins to be placed on the pasta.

The pre-cooked pasta rethermalizing machine of the invention can be used in fast food restaurants to serve pasta or it can be used cafeteria style where the operators of the machine are the actual diners who pay for each pre-cooked pasta portion and insert it themselves into the pasta receiving receptacle. The machine thereafter takes over once a button is depressed, immersing the pasta in the heating water and rethermalizing it the proper amount so that proper pasta consistency is obtained. After rethermalizing, the diner removes the basket containing the rethermalized pasta from its attachment to the machine, dispenses the rethermalized pasta onto a serving dish and applies the desired pasta sauce from one of the sauce basins.

As described, a feature of the invention is that it includes a counter so that the number of rethermalizing cycles and thus the number of pasta portions rethermalized can be recorded. The electronics of the machine can store this count in memory and further, send this information back to the owner of the machine via a modem (telephone line) so that the number of portions rethermalized can be determined. The machine is intended to be licensed for retail customer locations. The licensor desires to ensure that the licensee is using it properly. By keeping track of the number of cycles, the licensor can help to ensure that the unit is being used according to the license terms.

Although the invention will be described with respect to the rethermalizing of pasta products, it will be clear to those of skill in the art that the invention can also be used for the rethermalizing of other foodstuffs.

BRIEF DESCRIPTION OF THE DRAWINGS

The invention will now be described in greater detail in the following detailed description with reference to the drawings in which.

Figure 1:
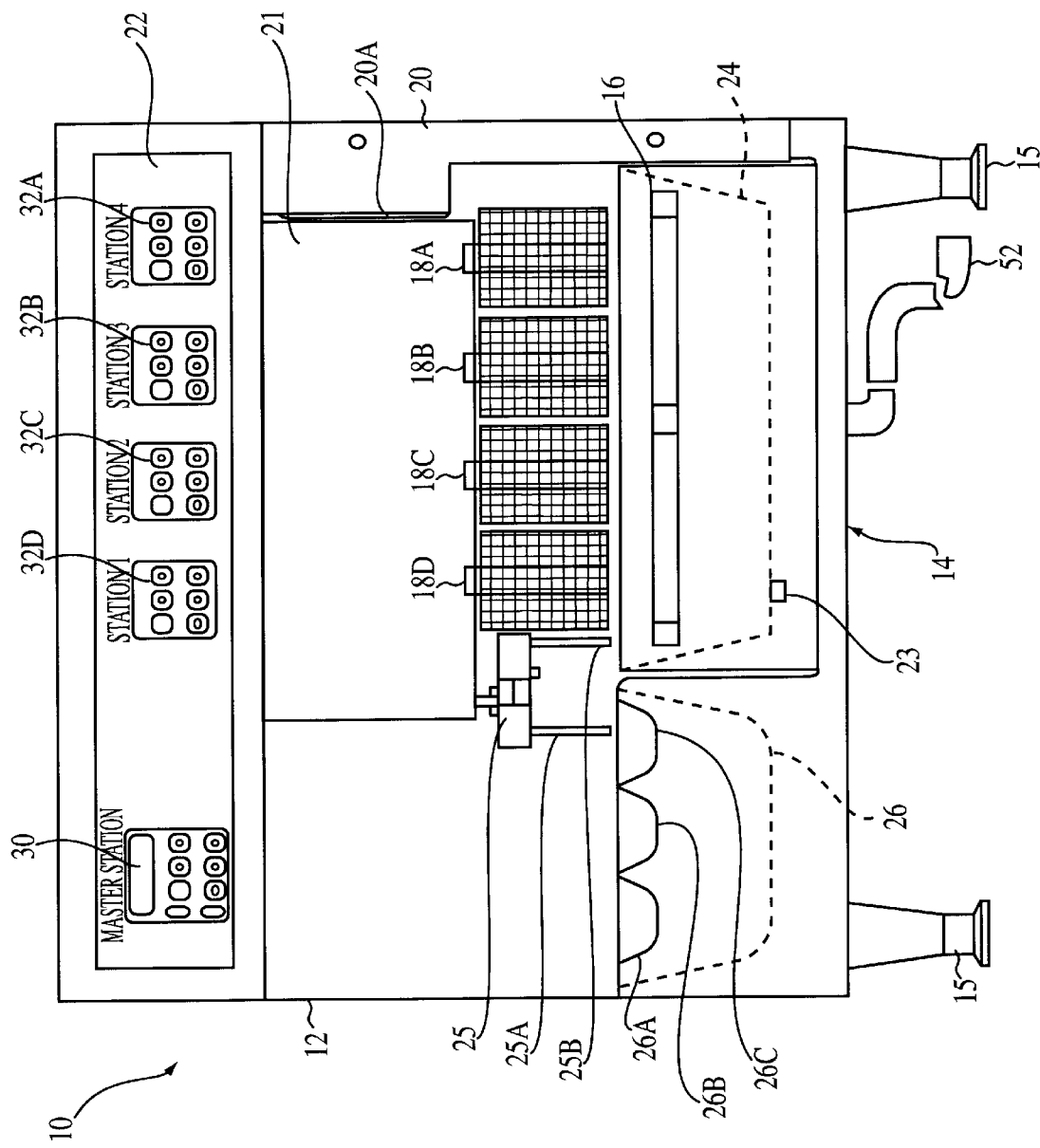
FIG. 1 is a front view of the apparatus for rethermalizing pasta according to the present invention.
Figure 2:
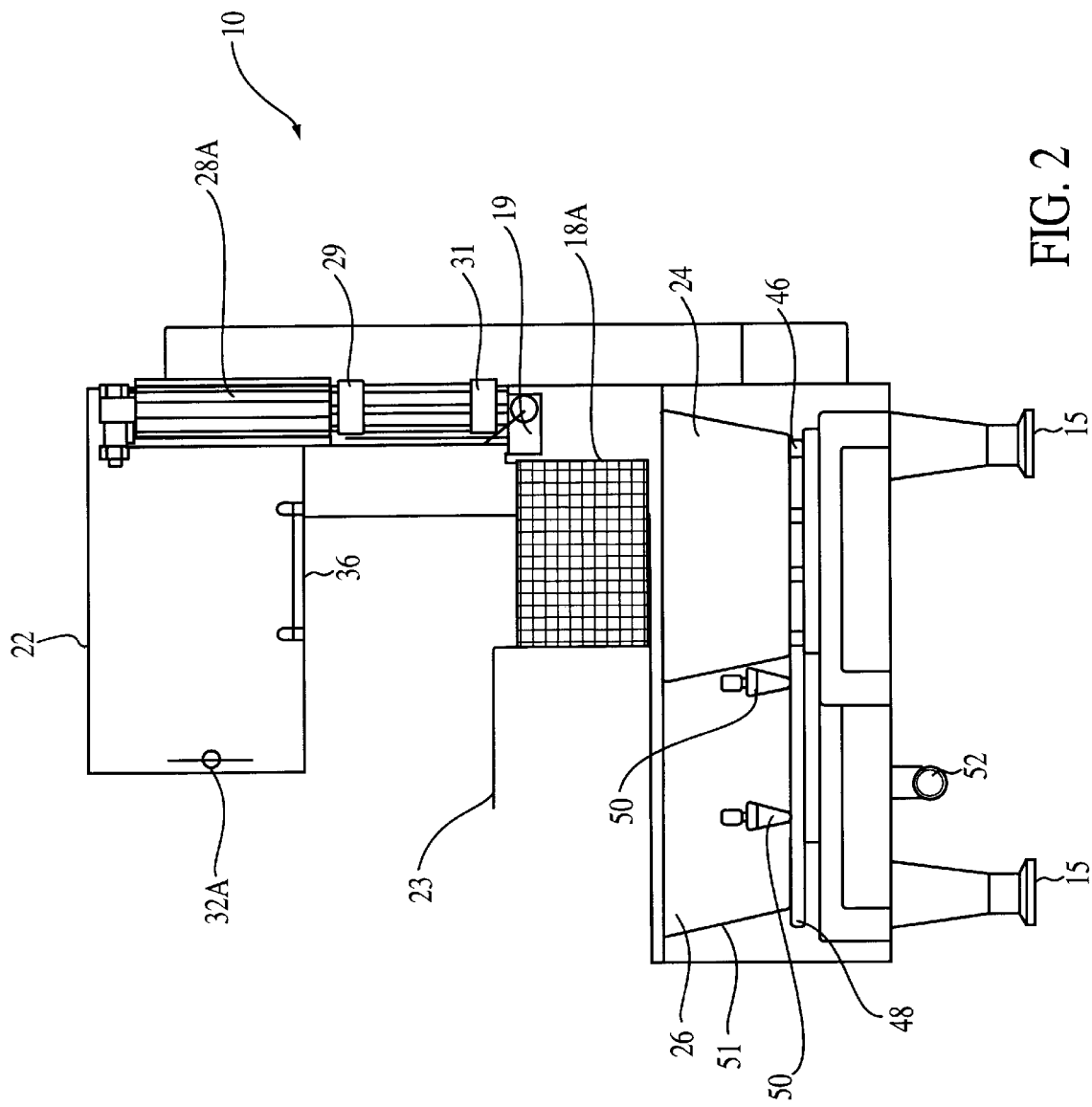
FIG. 2 is a partial cut away side view showing details of the invention.
Figure 3:
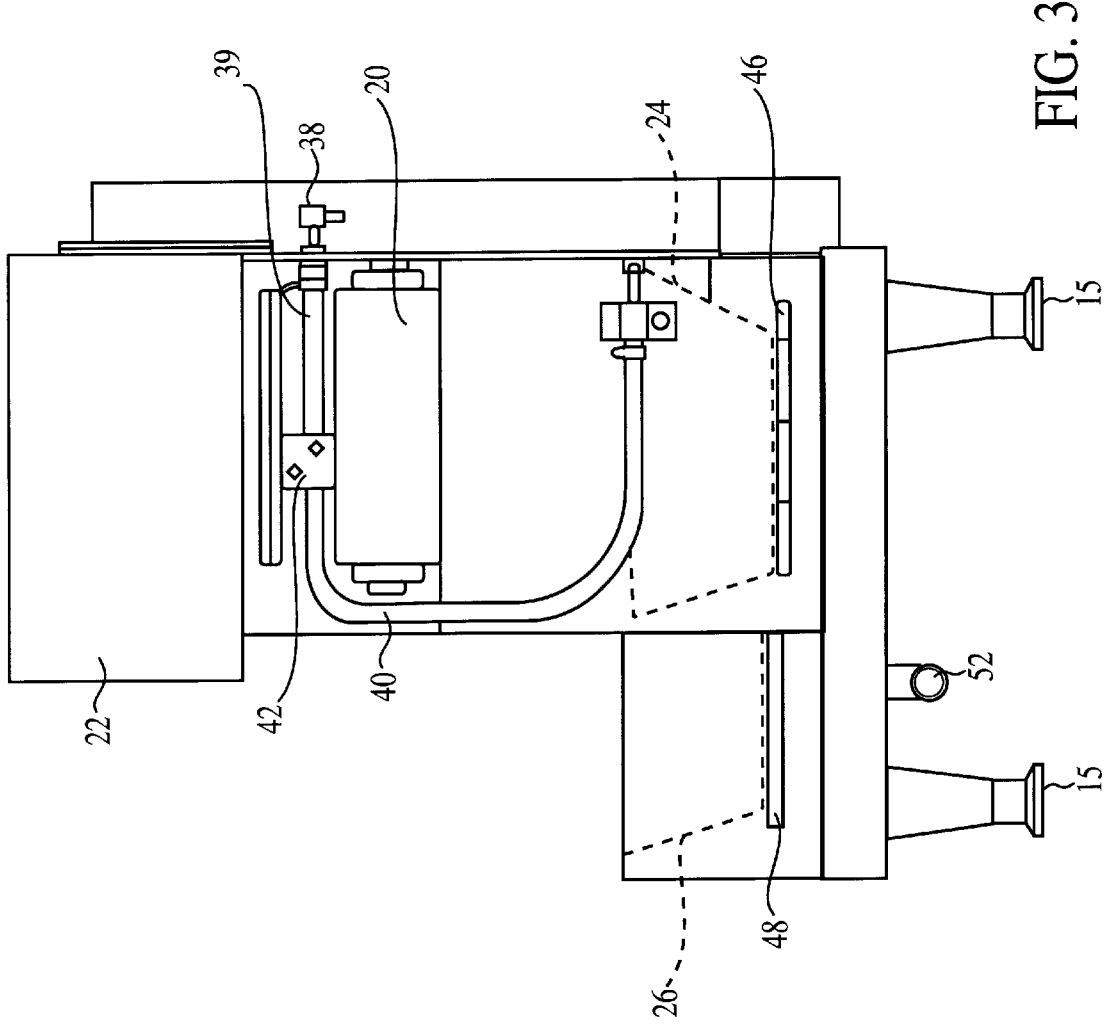
FIG. 3 is a further partial cut away side view showing further details of the invention.
Figure 4:
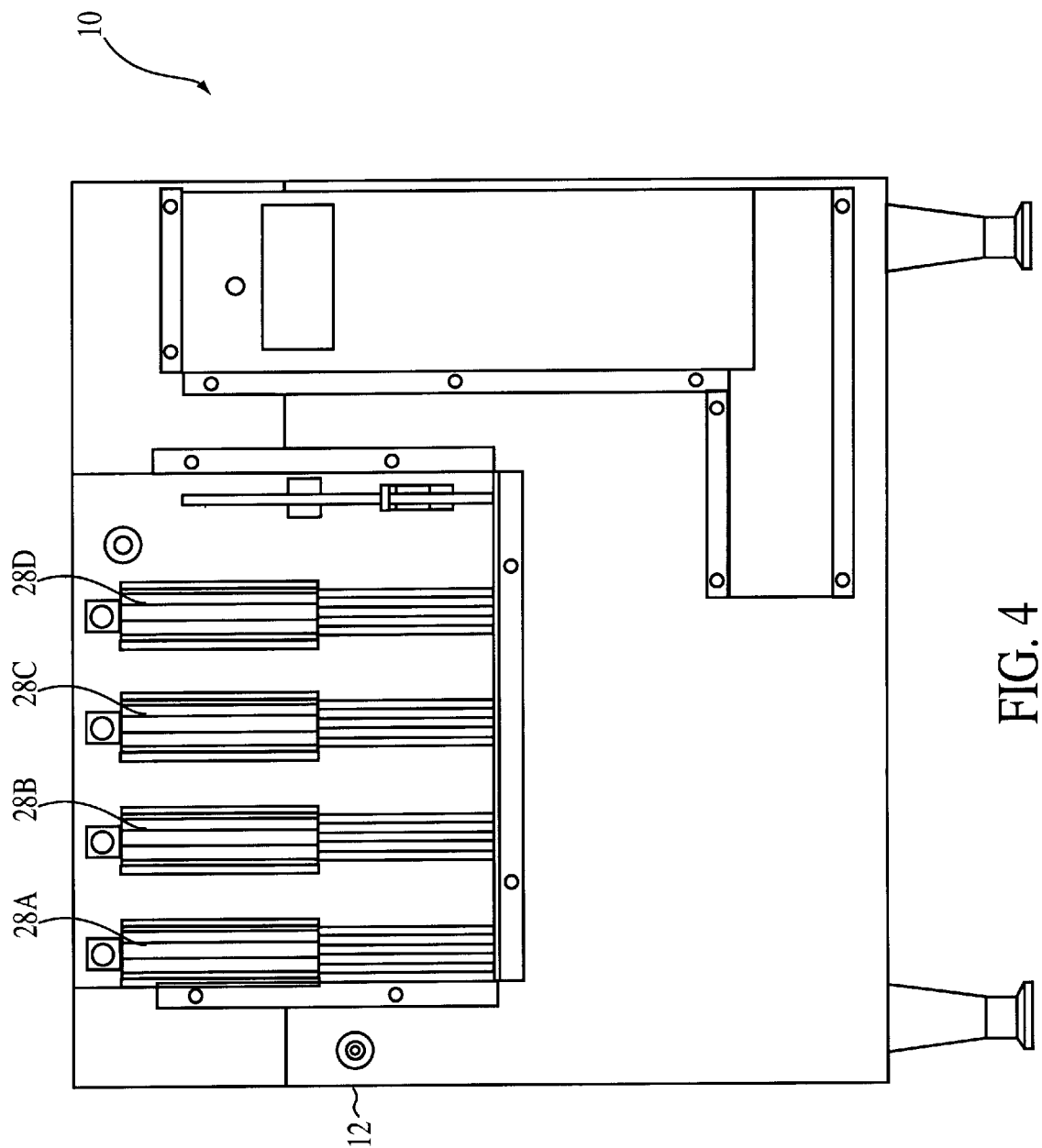
FIG. 4 is a partial cut away rear view of the invention.
Figure 5:
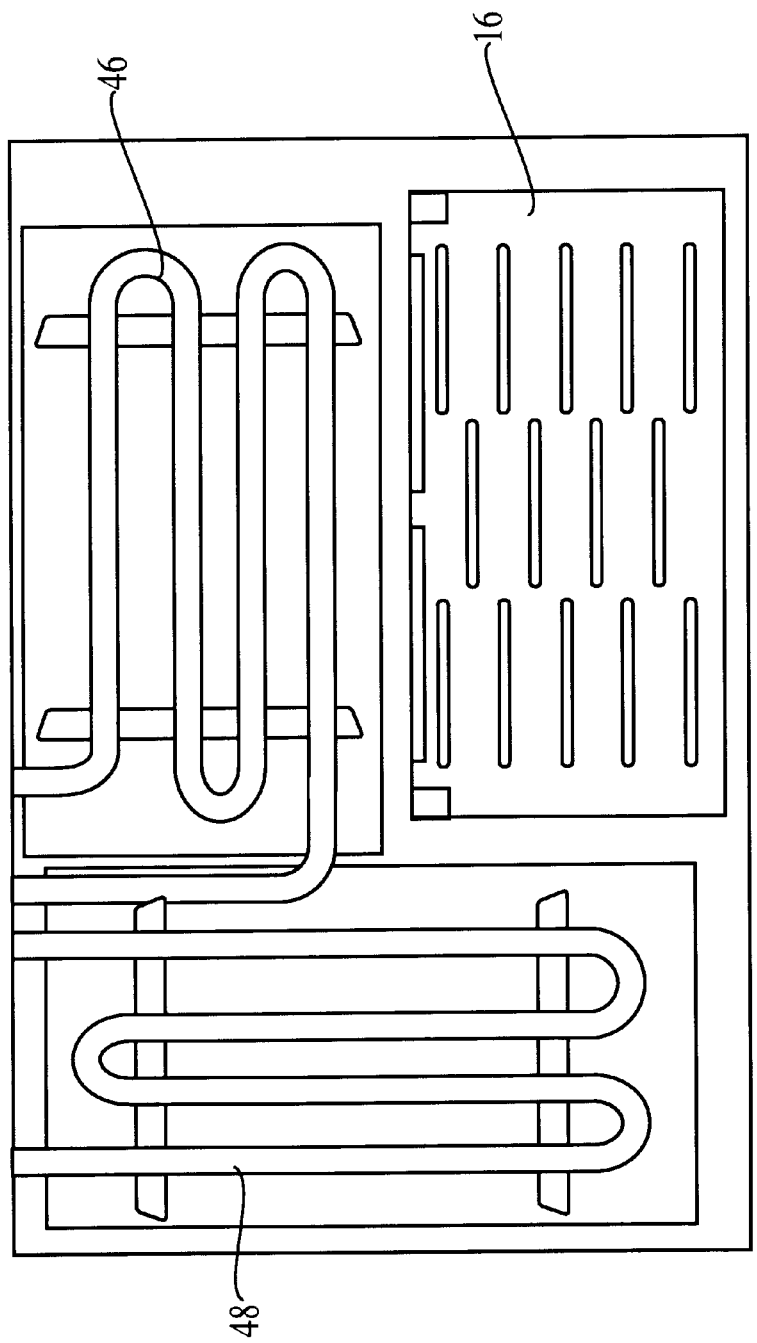
FIG. 5 is a partial cut away top view showing the heating coils and drain board of the apparatus of the invention.

Other details, advantages and features of the present invention will be apparent from the detailed description which follows.

DETAILED DESCRIPTION OF EMBODIMENTS OF THE INVENTION

With reference now to the drawings, the apparatus according to the present invention for rethermalizing individual sized portions of pre-cooked pasta is shown generally at 10. The invention provides for the final rethermalizing of pre-cooked individual sized portions of pasta, for example, frozen pasta portions which are individually wrapped in plastic bags. Each bag is frozen, contains one serving of a pasta product and is previously pre-cooked so that only a final rethermalizing to the desired texture and consistency is provided by the apparatus according to the present invention.

With reference to the drawings, the device 10 comprises a cabinet 12 including a base 14 provided with legs 15, a drain board 16, a plurality of baskets 18A, B, C and D for receiving the pre-cooked pasta products, a blower fan 20 and a control console 22. The device further includes a pasta heating basin 24 which is adapted to contain heated water for rethermalizing the pasta products and a basin 26 for holding heated water for heating a plurality of smaller basins 26A, B and C (more or less can be provided) holding condiments for the pasta products, for example, various sauces.

Blower 20 may be a cross flow blower QLK 45 Series rated at 75 CFM in free air, max static pressure 0.29 in. WC., available from Trans Flow Energy, Inc. of Mashpee, Mass. A hood 21 is disposed above the basin 24 for conveying heat, moisture and odors away. The blower 20 is also provided with a filter 20A.

The baskets 18A, B, C and D are each detachably coupled to a linear motor 28A, B, C and D, which are preferably electrically driven linear actuators or which may alternatively comprise hydraulic actuators. These linear actuators may be CALA 33 linear actuator available from SKF Specialty Products Co. of Bethlehem, Pa.

Figure 6:
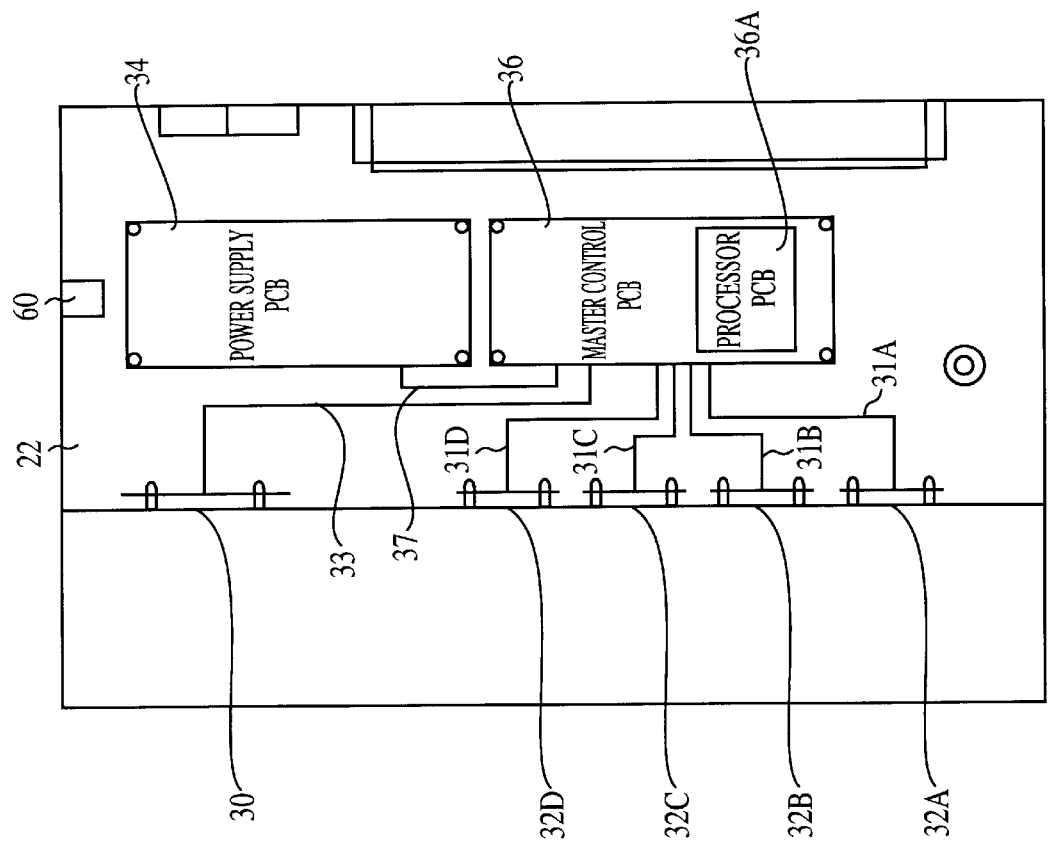
FIG. 6 is a partial cut away top view showing details of the arrangement of circuit boards and operator displays and controls of the invention.

The control console 22 includes a master station control panel 30 and a number of individual work station control panels 32A, B, C and D. Each work station control panel 32A, B, C and D is associated with and controls a respective basket 4A, B, C and D and respective actuator 28A, B, C, and D. The electronic circuit boards for the device are housed in the control console 22 and are shown in FIG. 6. The circuit boards include a power supply circuit board 34, a master control circuit board 36 and a circuit board for each work station panel 32A, B, C and D and the master station panel 30. The master control circuit board 36 is coupled to the master station panel 30 and the individual work station panels 32A, B, C and D. The master control circuit board 36 includes a microprocessor printed circuit board 36A which has the microprocessor mounted thereon. The microprocessor can be any of a number of controller microprocessors as known to those of skill in the art.

The master station 30 includes a number of buttons and displays. At the master station the buttons and displays are as follows:

| | |
|---|---|
| CYCLES | Pushing this button will display the total number of rethermalizing cycles completed by all four work stations to date on a display. |
| RESETS | Pushing this button will display the total number of resets (unfinished rethermalizing cycles) commanded at all four work stations to date. |
| SYS RESET | Pushing this button stops all rethermalizing cycles, resets the rethermalizing cycle timers and raises all baskets up and out of the pasta heating water. |
| ADD WATER | Pressing this button will automatically fill the pasta basin 24 with water to the correct level. The controller opens a solenoid valve allowing water to flow into the pasta heating basin and waits for a switch to actuate in 30 seconds signaling that the water has reached the low level/temperature sensor. Water will continue to fill the pasta heating basin 24 until another switch actuates signaling that the water has reached the high level sensor. The controller will maintain this level automatically. |
| ADD SAUCE WATER | This indicator light will illuminate and an alarm will sound when the sauce water level drops below the sauce water level/temperature sensing switch. Water must be added manually to the sauce heating basin 26. The operator lifts out one of the sauce containers and add water manually until the indicator light goes out. Alternatively, the invention can provide that the level in the sauce heating water basin 26 be automatically maintained in the same way as the water in the pasta heating water basin 24 by providing high and low water sensing switches. |
| PASTA TEMP OK | This indicator light will illuminate when the pasta heating water in basin 24 has reached the required temperature. The controller will then allow rethermalizing cycles to be initiated. |
| ON/OFF | Pushing the ON button enables all MASTER STATION functions and turns on the exhaust fan. |

Each of the four work station panels 32A, B, C and D also include a number of actuators and displays.

Each work station panel controls a respective basket 18A, B, C and D that is automatically lowered into and raised out of the pasta water by a respective motor/actuator 28A, B, C or D. Each panel has four buttons that initiate a rethermalizing cycle and correspond to one of four different rethermalizing times which are preset. A display is provided for each button. When a rethermalizing cycle is complete, the controller will raise the basket out of the pasta water and signal the operator with an audible tone.

The actuators at each work station panel are as follows:

| | |
|---|---|
| 85 | Pressing this button at any work station will command the controller to lower the associated pasta basket into the pasta water basin for a preset length of time: 85 seconds. |
| 100 | Pressing this button at any work station will command the controller to lower the associated pasta basket into the pasta water basin for a preset length of time: 100 seconds. |
| 150 | Pressing this button at any work station will command the controller to lower the associated pasta basket into the pasta water basin for a preset length of time: 150 seconds. |
| 200 | Pressing this button at any work station will command the controller to lower the associated pasta basket into the pasta water basin for a preset length of time: 200 seconds. |
| RESET | Pushing this button will reset the rethermalizing cycle timer and raise the associated basket up and out of the pasta heating water. |

The apparatus of the invention includes a water inlet 38 which is coupled to a building water supply. Inlet 38 is coupled to a pipe 39 and then through a control valve 42 into a further pipe 40 for providing water into the basin 24. Below the basin 24, an electric heater 46 is provided for conductively heating the water provided into the basin 24 for rethermalizing the pasta. Below the basin 26 for heating the condiments, each contained in individual sauce pans, e.g. 26A, B and C, an electric heating element 48 is provided for maintaining the condiments at the appropriate temperature. Drain valve 50 is provided for draining water contained in the basin 26 and drain valve 51 is provided for draining basin 24. The drained water from both basins is supplied to a drain pipe 52, which is connected to the building drain system.

The device operates as follows: The machine is first turned on via an on/off button on the master station panel. The device includes a main circuit breaker 60. In the illustrated embodiment, water is supplied manually into the sauce water basin 26 until it reaches the level of a temperature/level sensing probe. The probe is shown in FIG. 1 at 25A raised out of the basin 26. In use, the probe 25A is mounted on a sensing head 25 and lowered into the basin 24 and 26. A probe 25B for basin 24 is also mounted on sensing head 25. Head 25 is removable as a unit from the basins 24 and 26 to allow for cleaning. The temperature sensor on probe 25A may be a type LM34 CAH-ND Precision Fahrenheit Temperature Sensor manufactured by National Semiconductor. If the water is below the level of the temperature/level sensing probe 25A for the sauce water basin 26, the ADD SAUCE WATER indicator light on the master station panel 30 will light and an alarm will sound, alerting the user to add sauce heating water to basin 26.

The next step is to press the ADD WATER button on the master station panel 30. The electronic controller will allow water to flow into the pasta basin 24 via valve 42. Valve 42 is a solenoid operated valve and may be a Honeywell type C2 or CN2 Series valve. A low level switch which is a part of sensor/switch probe 25B will actuate once the water level has reached the level of the switch. The probe 25B also includes a temperature sensor. The temperature sensor may be a type LM 34 CAH-ND available from National Semiconductor. Preferably, the controller will check to determine if the low level water switch is actuated within 30 seconds. If the water flow is slow and the low level switch is not actuated within 30 seconds, the solenoid operated valve 42 will stop the flow of water. This is provided as a precaution to prevent flooding. A switch 23 is also provided which is actuated only when the basin 24 is in position to receive water from the water inlet of pipe 40. Pressing the ADD WATER button again will once more allow water to flow into the pasta heating basin 24. Once the water level has reached the low level limit switch of the temperature level sensing probe 25, the controller will turn on the heating element 46. If there is water in the sauce water basin 26, the controller will previously have turned on the heating element 48. Heater 46 may be a Chromalox type 840 3250W 240V 7/16 inch bent tubular electric heating element and heater 48 may be a Chromalox type 840 1000W 240V 7/16 inch tubular electric heating element. Water will continue to fill the pasta heating basin 24 after the low level switch of probe 25B has been actuated until another limit switch on probe 25B actuates signalling that the water has reached the high level. The controller will maintain this high level automatically as water evaporates by adding more water when necessary by controlling valve 42.

In approximately 20 minutes, the pasta water temperature in the basin 24 will be approximately 198° F. (92° C.) and the sauce water temperature will also be 165° F. (74° C.). The PASTA TEMP OK indicator light on the master station panel 30 will illuminate when the temperature in basin 24 reaches the preset temperature, indicating that the water in basin 24 is at the appropriate temperature.

The controller will now allow all work stations 32A, B, C and D to be operated. Once the temperature in the pasta basin 24 has reached 198° F. (92° C.) and each of the work station panels 32A, B, C and D have been enabled, a user can open the desired package containing an individual sized portion of pasta products and place same into one of the baskets 18A, B, C or D. Up to four persons can use the device at the same time. If desired, more work station panels 32 and associated workstations (baskets 18) can be provided to enable more diners to use a single machine. Each basket 18A, B, C and D is detachably coupled by a basket attachment 19 to one of the linear actuators 28A, B, C and D, which are in turn controlled by the electronic master control board 36, under the direction of the controls of the respective individual work station panels 32A, B, C or D.

Once the user has placed an individual sized portion of pasta into a basket 18A, B, C or D, the user operates the respective control panel 32A, B, C or D by pressing one of the buttons on the control panel. Each button corresponds to a preset amount of pasta rethermalizing time. For example, the button marked 85 corresponds to 85 seconds cooking time. The button marked 150 corresponds to 150 seconds of rethermalizing time. Once a button is depressed, the appropriate linear actuator 28A, B, C or D is operated, driving the basket containing the pasta products down into the basin 24 for the appropriate amount of time. Once the time period has elapsed, the linear actuator 28A, B, C or D is operated by the master control board 36 to remove the basket containing the rethermalized pasta product from the basin 24. The user can then grasp the particular basket 18A, B, C or D by its extending handle 23 to remove the basket from its attachment 19. The user can then dispense the rethermalized pasta product from the basket into an appropriate serving dish over the drain board 16. Drain board 16 also drains into drain pipe 52.

The device according to the present invention will not allow pasta products to be rethermalized unless the temperature in the basin 24 is at the preset temperature of 198° F. (92° C.) which achieves uniform and desired consistency and texture of the pasta. Accordingly, if the temperature in the basin 24 is too low, the linear actuators 28 will not be enabled and will not operate and, accordingly, the pasta cannot be undercooked. Because the temperature in the basin 24 is maintained at the desired rethermalizing temperature and the pasta is rethermalized only for the preset period of time determined by the button depressed, the pasta cannot be overcooked. The particular button that is depressed on each station corresponding to the desired rethermalizing time is determined depending on the type of pasta. For example, most spaghetti and ordinary pasta products are rethermalized using the 85 second rethermalizing interval. Pasta products such as ravioli or pierogi are rethermalized using one of the longer time intervals. Preferably, the user is instructed as to appropriate rethermalizing time by a chart which identifies various types of pasta products along with the rethermalizing time for the various pasta products.

Each linear actuator 28A, B, C and D includes respective limit travel switches 29A, B, C and D and 31A, B, C and D. Switches 29A, B, C and D are the high limit travel switches which stop movement of the associated linear actuator when the associated basket 18 is removed from the basin 24 and switches 31A, B, C and D are low limit travel switches which stop downward movement of the associated linear actuator when the associated basket 18 has been immersed in the basin 24.

A feature of the invention is that the master controller 36 includes a counter so that the number of rethermalizing cycles and thus the number of pasta portions rethermalized can be recorded. The controller can store this count in memory and further, this information can be sent back to the franchisor/licensor of the machine via a modem and telephone line, so that the number of portions rethermalized can be determined. A telephone/communication port connection is shown at 37 in FIG. 7. The machine is intended to be licensed for retail customer locations. In this way, the franchisor/licensor can keep track of whether the franchisee/licensee is using the machine properly. By keeping track of the number of cycles, the franchisor/licensor can help to ensure that the device is being used according to the licensed terms. In addition to the number of rethermalizing cycles, the franchisor/licensor can be provided other information concerning the operation of the machine via the telephone communication port, e.g., the number of resets, or incomplete cycles, or information on how often sauce heating water must be added to assist in future improvements or modifications to the system. Other information which may be useful to the franchisor/licensor and which can be transmitted via port 37 includes the rethermalizing times selected. In addition, the telephone/communication port can be used for remote troubleshooting, running of diagnostics to pin point problems and for remotely turning the device on or off.

At the end of each day of use of the system according to the present invention, the machine licensee shuts power off to the machine and removes the temperature sensing assembly 25 from the basin 24. In FIG. 1, the sensor assembly 25 is shown raised out of the basin 24 and 26. Sensor 25A is provided for the sauce heating basin 26 and sensor 25B is provided for the pasta water heating basin 24. The baskets 18 are then removed and the drains 50 and 51 for both the sauce and pasta heating water basins are operated to allow the hot water to drain into the drain pipe 52. After the hot water has been drained away, the sauce containers are removed and all contents can be emptied into refrigerated containers or otherwise disposed of. Both water basins 24 and 26 can be removed and cleaned.

Figure 7:
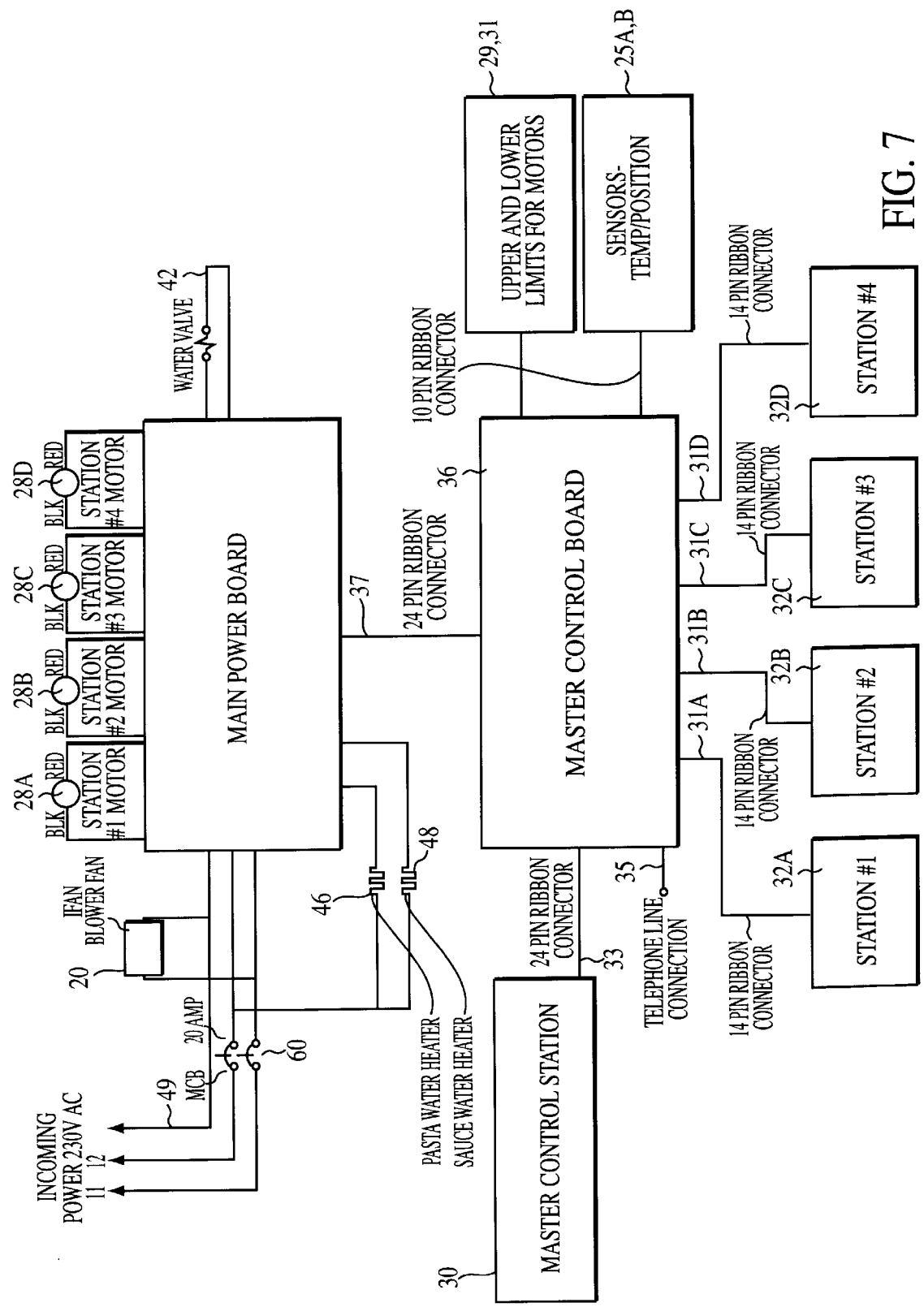
FIG. 7 is a block diagram of the electronic control circuitry of the present invention.

Turning now to FIG. 7, a block diagram of the system is shown. The device includes a main power board 34, a master controller board 36 include microprocessor PCB 36A, a plurality of individual work station panels 32A, B, C and D, a master control station panel 30, upper and lower limit switches 29A, B, C and D and 31A, B, C and D for the linear actuators and the temperature sensors and water level switch sensing probes 25A and 25B for the water in the basins 24 and 26. The pasta water heater 46 and the sauce water heater 48 are coupled to the mains supply 49 and switched on and off by the main power board 34 under control of the master control board 36 via bus 37. The water valve 42 is operated by the main power board 34 also under control of the master control board 36 via bus 37. The blower fan 20 is supplied power from the mains 49 and is turned on whenever the user turns the system on via the ON/OFF switch, which controls main contactor 60.

Each of the linear actuators 28A, B, C and D for the baskets 18A, B, C and D is controlled by the main power board 34 under control of the master control board 36 via bus 37.

Master control board 36 includes a telephone port connection, as discussed previously, for supplying information back to the machine franchisor/licensor concerning machine usage.

Figure 7A:
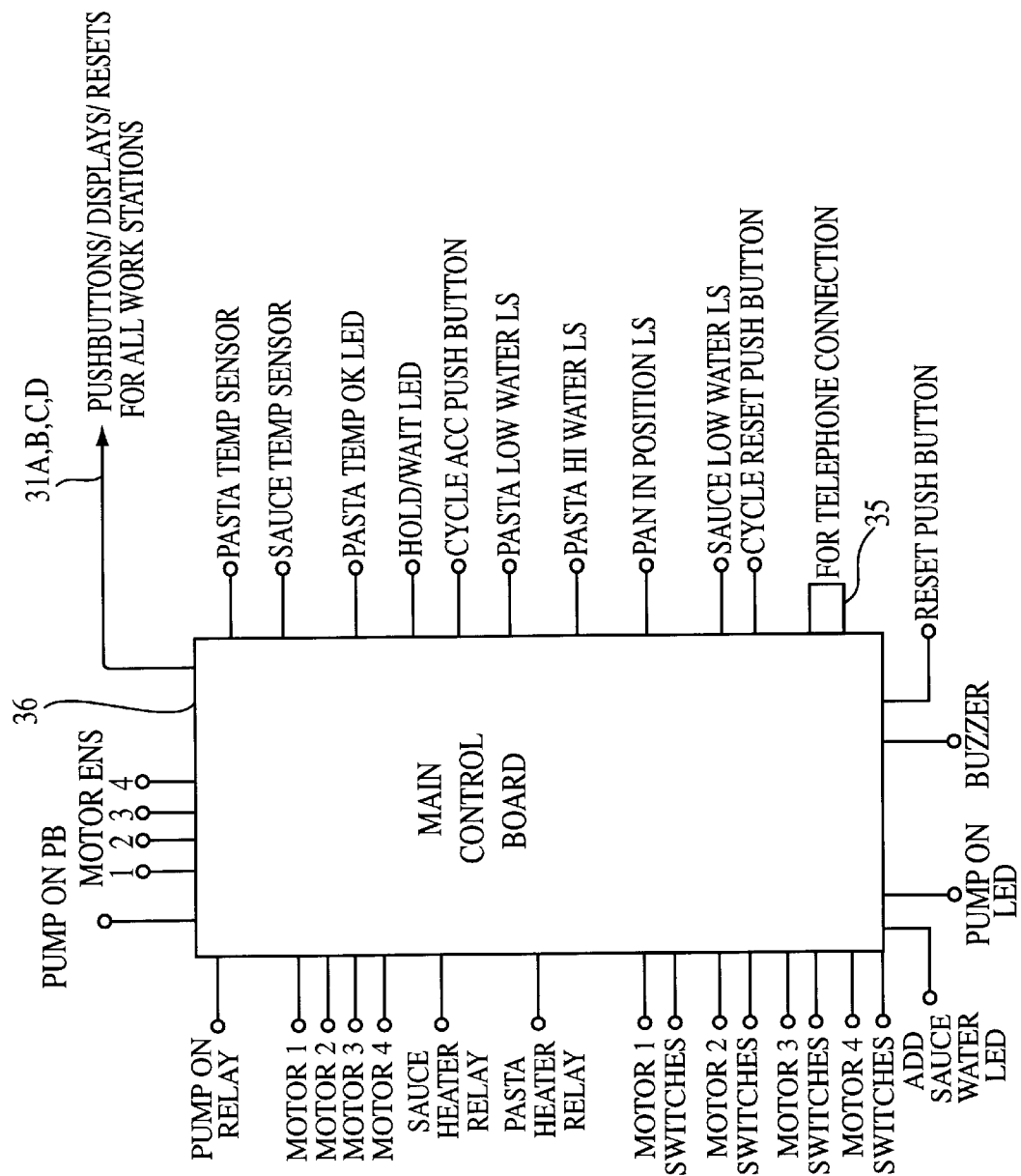
FIG. 7A is a more detailed block diagram of the master control board showing controlling and controlled inputs and outputs.

FIG. 7A shows further details of the controlling/controlled inputs and outputs coupled to master board 36. PUMP ON is a push button input (ADD WATER) which controls a PUMP ON relay. The PUMP ON relay opens water inlet valve 42. PUMP ON LED light is an indicator informing the operator that valve 42 is open. MOTOR 1, 2, 3 and 4 outputs and MOTOR 1, 2, 3 and 4 ENS (Enables) control the linear actuators 28A, B, C and D. SAUCE HEATER RELAY and PASTA HEATER RELAY outputs operate respective relays for heaters 48 and 46. MOTOR 1, 2, 3 AND 4 SWITCHES are inputs from HI and LO limit switches 29 and 31.

PASTA TEMP SENSOR and SAUCE TEMP SENSOR are inputs from temperature sensors on probes 25B and 25A respectively. PASTA TEMP OK LED turns on the LED on the master panel 30 to inform the user the temperature in basin 24 is at the desired temperature of 180° F. (82° C.). The HOLD/WAIT LED is lit while the device is rethermalizing pasta and is unlit when the basket 18 is removed from the heating water.

PASTA LOW WATER LS and PASTA HI WATER LS are the limit switch inputs from limit switches which are part of probe 25B and which provide signals when the low and high water limits are reached in basin 24. PAN IN POSITION LS is a signal from a switch 23 which indicates that pan 24 is in position to receive water from pipe 40. If pan 24 is not in position, valve 42 will not be actuated to supply water. SAUCE LOW WATER LS is a signal from a limit switch on probe 25A which indicates that water in basin 26 is low. A telephone connection 37 is provided for connection to a telephone line via a modem to supply cycle/reset data and any other desired data to a franchisor/licensor. A buzzer output is provided to signal that the sauce water is low. ADD SAUCE WATER LED illuminates an LED to inform the user that the sauce water is low.

All timer push buttons and resets as well as displays at the workstation panels 32A, B, C and D are coupled to the master control board 37, as shown at 31A, B, C and D.

CYCLE RESET PUSH BUTTON is coupled to the master panel cycle reset push button and will call from memory for display the number of resets that have occurred. CYCLE ACC PUSH BUTTON will recall from memory for display the number of rethermalizing cycles that have occurred. RESET PUSH BUTTON will cause the controller to reset.

Figure 8A:
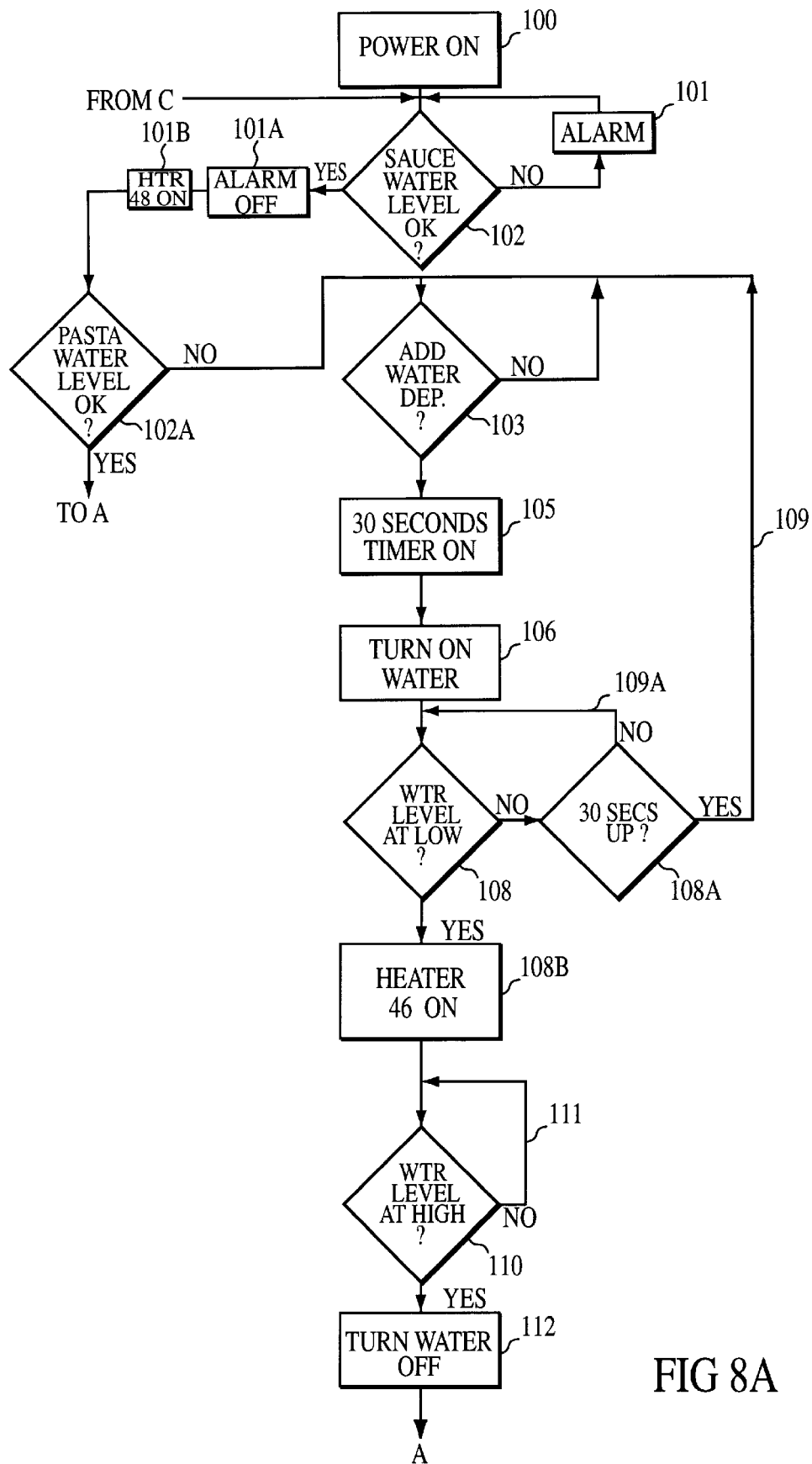
FIGS. 8A, 8B, and 8C are a block diagram of the software control flow implemented by the microprocessor controller of the present invention.

FIGS. 8A, B, C and D show the software flow implemented by the microprocessor controller board 36 of the invention. After the device is powered on (100), a check is made to determine if the water level in the sauce basin is at the appropriate level (102). If it is not, an indicator light will illuminate on the master panel and an alarm will sound (101). When water is added and the proper level is achieved, the indicator light and alarm will go off (101A) and heater 48 is turned on. The system then checks to determine if the pasta heating water level in basin 24 is proper (102A). If it is flow is to A, FIG. 8B. If it is not, the system checks to determine if the ADD WATER button has been depressed (103). If it has, a 30 second timer (105) is started and the water valve 42 is operated (PUMP ON) to allow water to enter the water basin (106). A check is then made to determine if the water level has reached the low level sensor (108). If it has not, a check is made to see if the 30 sec timer has timed out (108A). If it has, a return (109) is made as indicated and the ADD WATER button must be depressed again. If 30 secs has not elapsed, a return 109A is made and the water level is again checked. As soon as the water level has reached the low level sensor (108), the heating element 46 is turned on (108B). A check is then made to determine if the water level has reached the high level sensor (110). If not, a return (111) is made. Once the water level has reached the high level sensor, the water valve is turned off (112). Since the controller sequences through the flow path of FIGS. 8A, B and C continuously, if at any time the water level goes below the high water level, the water valve will be turned on to provide more water into the basin 24.

Figure 8B:
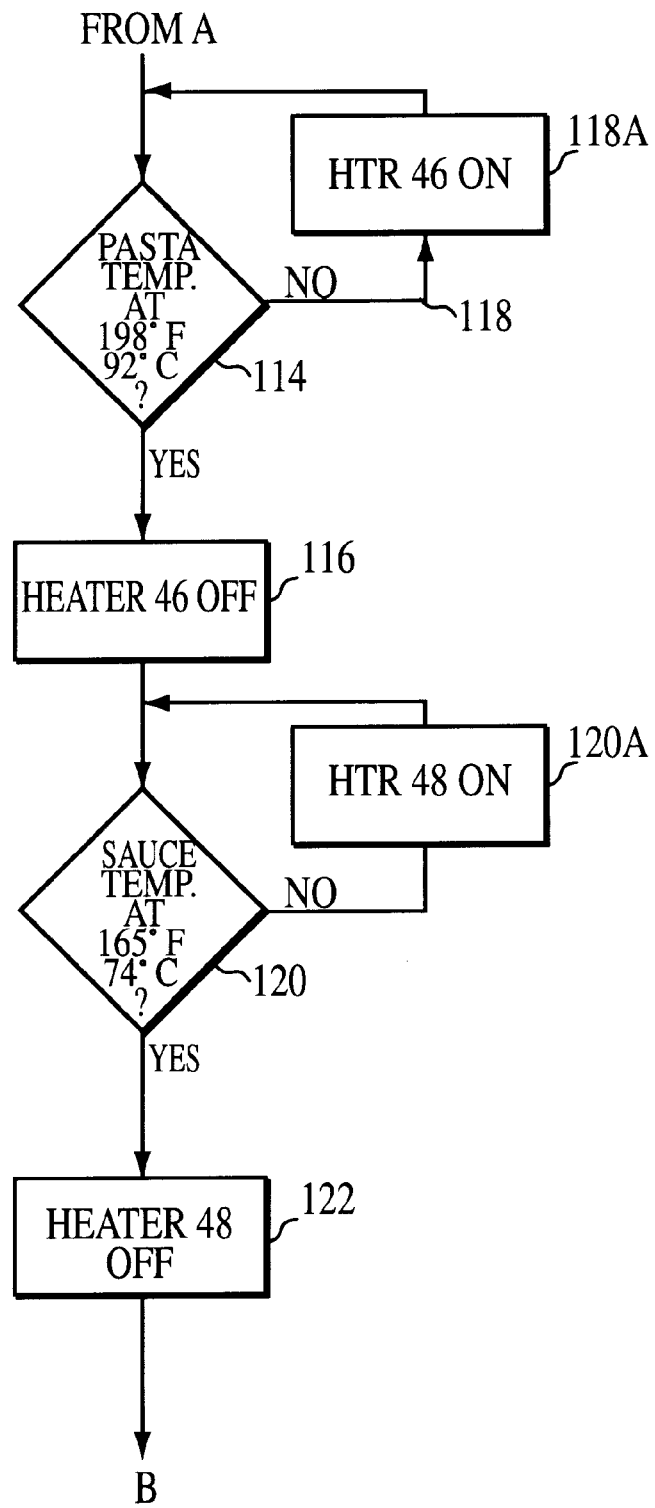

Turning to FIG. 8B, the master control board then monitors the temperature of the water in the basin 24 (114) and if it has reached 198° F. (92° C.), the heater is turned off (116). If not, a return (118) is made and the heater 46 is maintained on or turned on (118A). Similarly, a check is made to determine if the water temperature in the sauce water basin is at 165° F. (74° C.) (120). If it is, the heater 48 is turned off (122). If not, the heater 48 remains on or is turned on (120A). The water level and temperatures are continuously monitored, as discussed.

Figure 8C:
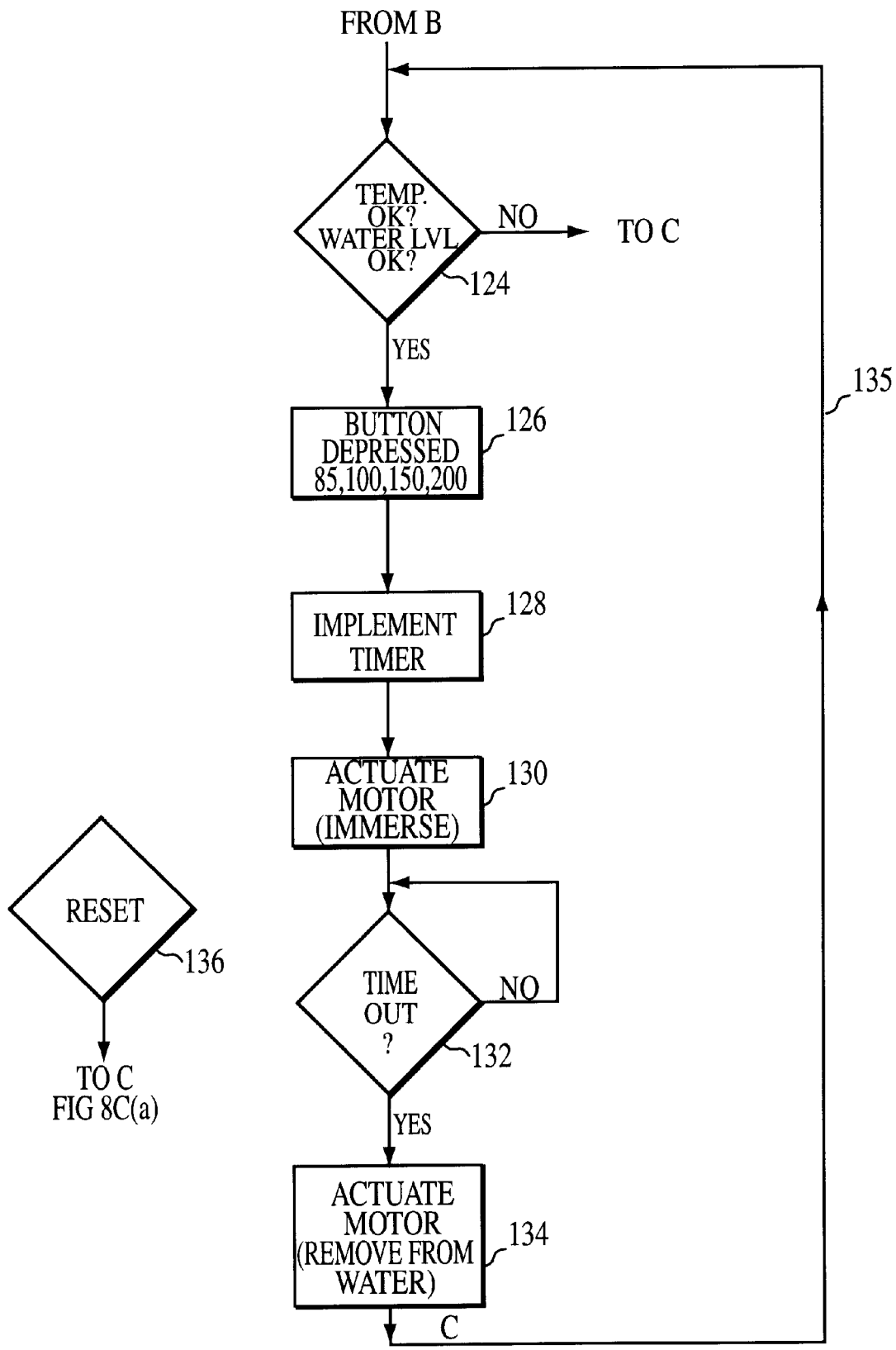

The program flow is then made to FIG. 8C. If the pasta heating water temperature goes below the required temperature of 198° F. (92° C.), the temperature sensor will detect the decrease in the temperature and the heater 46 will be turned on at the appropriate time.

FIG. 8C shows the operation of the system once the temperatures in the basins have reached the correct temperatures and the water levels are correct. If the temperatures and water levels are proper (124), the master control board 36 waits for the user to load a pasta portion into a basket 18A, B, C or D and to press an appropriate button which determines the amount of cooking time. Once a button (126) is depressed, a timer (128) is implemented and a motor 28A, B, C or D is actuated to drive the basket 18 into the heated water in the basin 24 (130). The timer stated at 128 is monitored (132) to determine if it has timed out. Once it has timed out (132), the motor 28A, B, C or D is actuated (134) to remove the basket from the heating water. A return is made to B (135). Once the linear actuator 28A, B, C or D has reached the upper limit of its travel, the user can remove the basket 18, empty the contents into an appropriate serving dish and apply the desired sauce.

As shown in FIG. 8C(*a*), the system monitors for actuation of the reset push button at all times (136). If reset is detected, a return is made to C of FIG. 8A.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. Apparatus for rethermalizing of a pre-cooked food product, comprising:
   a support;
   a heating chamber on the support adapted to receive a heating fluid;
   a controlled valve for supplying heating fluid to the heating chamber;
   at least one rethermalizing receptacle for holding the food product;
   a first heater for heating the heating fluid in the heating chamber;
   a first temperature sensor disposed in the heating chamber;
   a first level sensor for sensing the level of the heating fluid in the heating chamber;
   a driving device for moving the rethermalizing receptacle from a first position outside the heating chamber to a second position within the heating chamber to rethermalize the food product;
   an electronic controller receiving an input from said temperature sensor and an input from said level sensor and having an output for controlling the controlled valve to maintain the level of the heating fluid in the heating chamber at a preset level; the controller further having an output for controlling the heater for heating the heating fluid when it has reached a predetermined level and for maintaining the temperature of the heating fluid at a preset temperature; said controller preventing said driving device from moving the rethermalizing receptacle to the second position unless the level of the heating fluid is at the preset level and the temperature of the heating fluid is at the preset temperature; said controller further comprising a timer for maintaining the rethermalizing receptacle in the second position for a preset period of time and for controlling the driving device to move the rethermalizing receptacle to the first position after said preset period of time.

2. The apparatus of claim 1, further comprising a plurality of rethermalizing receptacles each independently movable by a respective driving device under control of the electronic controller.

3. The apparatus of claim 1, wherein the driving device comprises a linear actuator movable so as to move the rethermalizing receptacle from the first position to the second position and after the preset time, back to the first position.

4. The apparatus of claim 1, further comprising a second level sensor, the first level sensor comprising a sensor for determining if the level of the heating fluid is at the preset level, the second level sensor for determining if the heating fluid is at a second level below the first level, the second level corresponding to the predetermined level, and wherein the controller prevents heating of the heating fluid in the heating chamber until the heating fluid reaches said second level.

5. The apparatus of claim 4, further comprising a timer for determining if the heating fluid from the controlled valve reaches the second level in a defined period of time, and if the heating fluid does not reach the second level within the defined period of time, for closing the controlled valve to turn off the supply of heating fluid to the heating chamber.

6. The apparatus of claim 1, further comprising a second heating chamber receiving a second heating fluid and a second heater for heating the second heating fluid.

7. The apparatus of claim 6, wherein the second heating chamber receives at least one basin containing a condiment for the rethermalized food product.

8. The apparatus of claim 7, wherein a plurality of basins are provided for receiving a plurality of condiments.

9. The apparatus of claim 7, further comprising a level sensor for detecting if the level of the second heating fluid is below a certain level and for providing a signal to said electronic controller if the level is below the certain level.

10. The apparatus of claim 7, further comprising a second temperature sensor for detecting the temperature of the second heating fluid and for providing a signal to the electronic controller proportional to the temperature.

11. The apparatus of claim 1, wherein the first temperature sensor provides a signal to the electronic controller, the electronic controller determining if the temperature has reached the preset temperature and enabling the driving device to be activated to place the rethermalizing receptacle in the second position.

12. The apparatus of claim 1, wherein the electronic controller includes a microprocessor.

13. The apparatus of claim 1, further comprising a connector for connecting the controlled valve to a water supply.

14. The apparatus of claim 13, further comprising a drain coupled to the heating chamber and a valve between the heating chamber and drain.

15. The apparatus of claim 3, further comprising a control panel for controlling operation of each driving device coupled to each rethermalizing receptacle.

16. The apparatus of claim 1, further comprising a blower fan for removing heat and/or odors from above the rethermalizing receptacle.

17. The apparatus of claim 16, further comprising a hood coupled to the blower fan for assisting in removing heat from above the rethermalizing receptacle.

18. The apparatus of claim 1, wherein the first level sensor and first temperature sensor comprise a probe that is movable into and out of the heating chamber.

19. The apparatus of claim 2, further comprising a master control panel for user interaction with the electronic controller.

20. The apparatus of claim 1, further comprising a communication port coupled to said electronic controller.

21. The apparatus of claim 20, further wherein the electronic controller comprises a memory for storing a first number of times the rethermalizing receptacle has been placed into said second position for the preset period of time.

22. The apparatus of claim 21, further wherein the electronic controller comprises a memory for storing a second number of times the driving device has been reset from the second position to the first position before the preset period of time has elapsed.

23. The apparatus of claim 21, wherein the electronic controller can provide the first number to a distant location via said communication port.

24. The apparatus of claim 22, wherein the electronic controller can provide the second number to a distant location via said communication port.

25. The apparatus of claim 22, wherein the electronic controller can provide the first and second numbers to the distant location via said communication port.

26. The apparatus of claim 1, wherein the heating chamber is detachable from the driving device.

27. The apparatus of claim 1, wherein the heating chamber comprises an apertured container to allow heating fluid to flow therethrough.

28. The apparatus of claim 1, wherein the first heater comprises an electric heater.

29. The apparatus of claim 26, further comprising a drain board over which the food product in the heating chamber receptacle can be dispensed onto a food serving receptacle.

30. The apparatus of claim 4, wherein the linear actuator has first and second limit switches for respectively sensing when the rethermalizing receptacle is in the first and second positions.

31. The apparatus of claim 1, further comprising a sensor for sensing that the heating chamber is in position and for providing a signal to the electronic controller, the electronic controller preventing said controlled valve from opening unless said heating chamber is in position.

32. A method for final rethermalizing of a pre-cooked food product, the method comprising the steps of:
   providing a heating fluid into a heating chamber via a controlled valve;
   sensing the level of the heating fluid in the heating chamber;
   controlling the controlled valve to maintain the level of the heating fluid in the heating chamber at a preset level;
   heating the heating fluid when it has reached a predetermined level;
   sensing the temperature of the heating fluid in the heating chamber;
   maintaining the temperature of the heating fluid at a preset temperature;
   placing the food product into at least one rethermalizing receptacle;
   moving the rethermalizing receptacle from a first position outside the heating chamber to a second position within the heating chamber to rethermalize the food product when the temperature of the heating fluid is at the preset temperature and the level of the heating fluid is at the preset level;
   maintaining the rethermalizing receptacle in the second position for a preset period of time while maintaining the preset temperature and the preset level of the heating fluid; and
   moving the rethermalizing receptacle to the first position after said preset period of time.

33. The method of claim 32, further comprising providing a plurality of independently movable rethermalizing receptacles to rethermalize a plurality of food products.

34. The method of claim 32, further comprising determining if the heating fluid is at a second level below the preset level, the second level corresponding to said predetermined level, and further comprising preventing heating of the heating fluid in the heating chamber until the heating fluid reaches said second level.

35. The method of claim 34, further comprising determining if the heating fluid reaches the second level in a defined period of time, and if the heating fluid does not reach the second level within the defined period of time, closing the controlled valve to turn off the supply of heating fluid to the heating chamber.

36. The method of claim 32, further comprising providing a second heating chamber receiving a second heating fluid.

37. The method of claim 36, further comprising providing the second heating chamber with at least one basin containing a condiment for the rethermalized food product.

38. The method of claim 37, further comprising detecting if the level of the second heating fluid is below a certain level and providing a signal if the level of the second heating fluid is below the certain level.

39. The method of claim 37, further comprising detecting the temperature of the second heating fluid and providing a signal proportional to the temperature.

40. The method of claim 32, further comprising determining if the temperature has reached the preset temperature and enabling a driving device to be activated to place the rethermalizing receptacle in the second position.

41. The method of claim 32, further comprising connecting the controlled valve to a water supply.

42. The method of claim 32, further comprising removing heat from above the heating chamber.

43. The method of claim 32, further comprising determining the heating fluid level and temperature using a level sensor and temperature sensor on a probe that is movable into and out of the heating chamber.

44. The method of claim 32, further comprising providing a communication port coupled to said electronic controller and providing information concerning the final rethermalizing to a distant location.

45. The method of claim 44, further comprising storing a first number of times the rethermalizing receptacle has been placed into said second position for the preset period of time.

46. The method of claim 45, further comprising storing a second number of times the rethermalizing receptacle has been moved from the second position to the first position before the preset period of time has elapsed.

47. The method of claim 45, further comprising providing the first number to a distant location via said communication port.

48. The method of claim 46, further comprising providing the second number to a distant location via said communication port.

49. The method of claim 46, further comprising providing the first and second numbers to the distant location via said communication port.

50. The method of claim 32, further comprising removing the rethermalizing receptacle from a driving device moving the rethermalizing receptacle after the preset period of time and dispensing the rethermalizing food product.

51. The method of claim 32, further comprising providing said rethermalizing receptacle as an apertured container to allow heating fluid to flow therethrough.

52. The method of claim 32, further comprising sensing that the heating chamber is in position and providing a signal to prevent said controlled valve from opening unless said heating chamber is in position.

53. A method for monitoring a rethermalizing operation from a remote location, comprising: repetitively performing a rethermalizing operation at a first location;
   providing a sensor for determining the number of times the rethermalizing operation has been performed at the first location;
   providing a memory at the first location for storing a count related to the number of times the rethermalizing operation has been performed at the first location; and
   communicating a signal over a communication path to a second, remote location corresponding to the count related to the number of times the rethermalizing operation has been performed at the first location.

54. Apparatus for monitoring a rethermalizing operation from a remote location, comprising:
   a rethermalizing apparatus for repetitively performing a rethermalizing operation at a first location;
   a sensor determining the number of times the rethermalizing operation has been performed at the first location;

a memory at the first location storing a count related to the number of times the rethermalizing operation has been performed at the first location; and a communication device for communicating a signal over a communication path to a second, remote location corresponding to the count related to the number of times the rethermalizing operation has been performed at the first location.

* * * * *